United States Patent
Vise

[15] 3,643,606
[45] Feb. 22, 1972

[54] TABLE STRUCTURE FOR USE IN MOTOR VEHICLES

[72] Inventor: Mathias Joseph Vise, Untere Ibern 5, Eupen, Belgium

[22] Filed: June 25, 1970

[21] Appl. No.: 49,850

[30] Foreign Application Priority Data

June 26, 1969 Germany .................... P 19 32 357.0

[52] U.S. Cl. .................................................. 108/44
[51] Int. Cl. ................................................... A47b 23/00
[58] Field of Search ...................... 108/42, 49, 50

[56] References Cited

UNITED STATES PATENTS

| | | | |
|---|---|---|---|
| 1,880,621 | 10/1932 | Willetts | 108/42 |
| 1,398,496 | 11/1921 | Saltalamachia | 108/47 UX |
| 2,211,962 | 8/1940 | Morris | 108/44 X |
| 2,856,251 | 10/1958 | Garrison | 108/44 |
| 3,074,745 | 1/1963 | Burekhalter | 108/44 |

FOREIGN PATENTS OR APPLICATIONS 552,891  2/1953  Canada ................................... 108/44

Primary Examiner—Bobby R. Gay
Assistant Examiner—Glenn O. Finch
Attorney—Walter Becker

[57] ABSTRACT

A table structure, especially for suspension on a steering wheel of a motor vehicle, which comprises two table sections hinged together and foldable selectively toward and away from each other into a plurality of positions in which they are arrestable while the back of the table structure is provided with a plurality of bearing means each being adapted selectively to receive suspension means for suspending the table structure at different heights over a steering wheel so as to accommodate the height of suspension of said table structure to the convenience of the user of said table structure.

8 Claims, 4 Drawing Figures

INVENTOR.
Mathias Joseph Visé

TABLE STRUCTURE FOR USE IN MOTOR VEHICLES

The present invention relates to a table structure of wood, synthetic material, or metal for use in motor vehicles and, more specifically, concerns a table structure which, with regard to its width, is subdivided into two sections hinged to each other and adjustable from a position in which the sections are folded upon each other to any position intermediate said folded together position and completely unfolded position, while connecting means are provided on the back side of the table structure for mounting the same.

The provision of connecting means on the back side of such table structure affords a rather limited employment of the table structure in connection with steering wheels of different diameters. With a certain definite diameter of the steering wheel, however, the table structure can in straight suspension occupy one certain position only so that the height of the table structure in the plane of the steering wheel cannot be varied. Consequently, there exists no possibility to adapt the height, for instance, to the size of the respective person using the table structure. The inclination of the table structure is determined by the position of the plane of the steering wheel inasmuch as both sections of the table structure need the steering wheel as support. Consequently, the person using the table structure cannot adjust the same to his convenience.

It is also known to pivotally connect a table structure for use in motor vehicles to a holding member extending over the steering wheel so that it is possible to pivot the plate of the table structure from the plane of the steering wheel into, for instance, a horizontal plane. When reaching its approximate horizontal end position, the table structure will engage an adjustable abutment. By adjusting this abutment, an adjustment of the approximately horizontal end position of the table structure is possible to a certain limited extent. This, however, is the only possibility of adjusting a heretofore known table structure to the needs of the respective user. The distance of the free table plate edge from the steering wheel and the height of the table structure folded out to its position of use cannot be varied. The slight change in the inclination alone is totally insufficient to adapt the position of the table structure to the size of the respective user.

It is, therefore, an object of the present invention to provide a table structure for use in motor vehicles, which will overcome the above-mentioned drawbacks.

It is another object of this invention to provide a table structure as set forth above, which cannot only be adapted to the size of the diameter of the steering wheel but also in particular to the size of the respective user of the table structure and his personal requirements.

These and other objects and advantages of the invention will appear more clearly from the following specification in connection with the accompanying drawings, in which.

Figure 1:
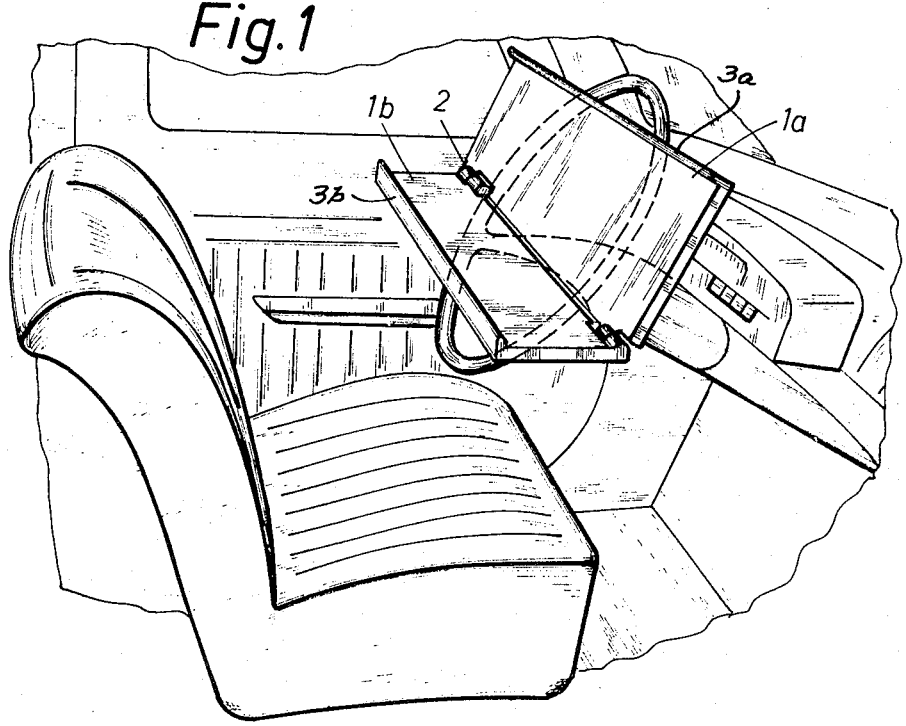
FIG. 1 illustrates in perspective the table structure according to the present invention in its position of use in a motor vehicle.

The table structure according to the present invention which, as to width, is subdivided into two uneven sections interconnected by hinge means and having its rear side provided with connecting means is characterized primarily in that both plate sections are equipped with a plurality of supporting means for connecting yokes or hooks.

A table structure designed in the above manner can, to a considerably greater extent than heretofore known structures of the type involved, adapt itself to the size and requirement of the respective user. The distance between the free edges of the respective approximately horizontal table plate section and the steering wheel can be changed by inserting the connecting yoke or hook into supporting means of the respective other table or plate section. Also, the height of the respective horizontal plate section can be sufficiently varied by selecting a suitable support on the other table section. The adaptability to the respective diameter of the steering wheel will be maintained.

It is advantageous to provide rim strips along the longitudinal edges of the two table sections to that at any rate a border strip will be available regardless of whether the lower or upper table section is employed as table plate.

According to a further feature of the invention, the back side of the plate is equipped with a connecting yoke for suspending the table structure on the steering wheel. Advantageously, the connecting yoke is made in a manner known per se from a round profile, whereas the supporting means are designed as bores.

The adaptability of the table structure according to the present invention may furthermore be increased when making the hingeing means of hinge sections which are provided with teeth at their adjacent end surfaces and can axially be separated from each other against the thrust of a spring. Advantageously, the teeth may be in the manner of the teeth of a ratchet wheel.

Referring now to the drawings in detail, the table structure illustrated therein comprises a relatively wide table section 1a and a narrow table section 1b. The table sections 1a and 1b are pivotally connected to each other by hinge means 2 in such a way that the useful surfaces can be tilted relative to each other from a common plane by 180° so that the two table sections can be folded upon each other. In order to be able to take into consideration the different inclination of steering wheels in different types of motor vehicles, the two table sections 1a and 1b may be arrested relative to each other in a plurality of positions intermediate the two extreme positions. The adjustment may be effected either in an infinitely variable manner or in small steps as shown in connection with the illustrated embodiment of the invention.

The free longitudinal edges of the two table sections 1a and 1b are confined by protruding rim strips 3a and 3b so that articles on the useful surface of the table structure cannot slip off toward the user.

Figure 2:
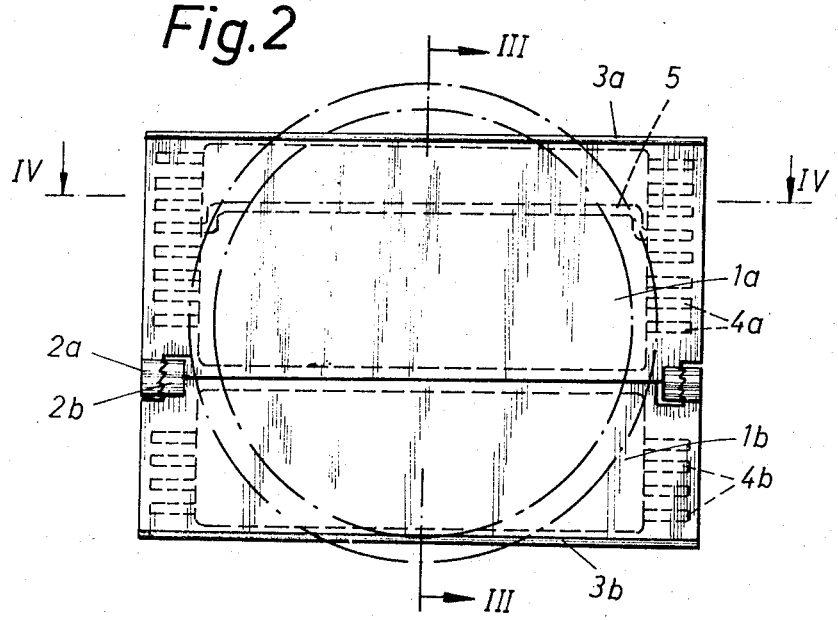
FIG. 2 shows a top view of the table structure according to FIG. 1 in completely unfolded condition.
Figure 3:
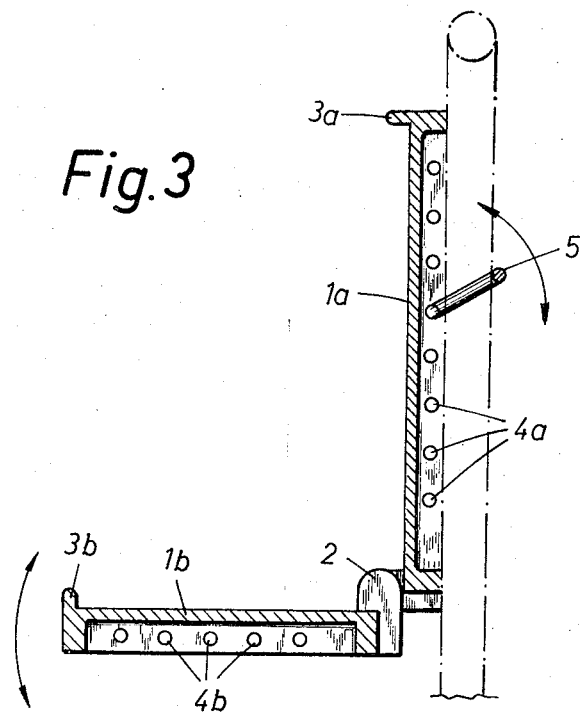
FIG. 3 is a section through the table structure according to the invention with the two sections forming substantially a right angle with regard to each other, said section being taken along the line III—III of FIG. 2.
Figure 4:
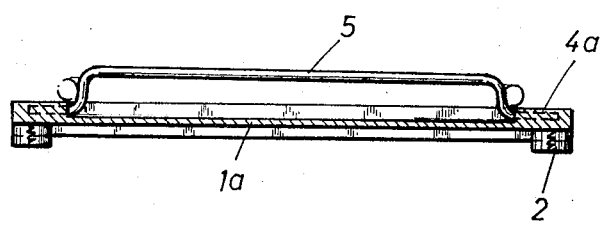
FIG. 4 is a section through the table structure according to the invention, said section being taken along the line IV—IV of FIG. 2.

According to the specific example illustrated in the drawing, the hinge means 2 comprise hinge sections 2a and 2b which have those end faces thereof which engage each other provided with teeth (see FIG. 2). Hinge sections 2a and 2b are, by means of a pressure spring (not shown) and bent into the hinge means, pressed against each other. For adjusting the two table sections 1a and 1b relative to each other, it is sufficient to displace the two table sections 1a and 1b in longitudinal direction with regard to each other against the pressure of the above-mentioned spring by a few millimeters until the teeth are out of mesh so that the two table sections 1a and 1b can be tilted relative to each other.

The teeth on said hinge sections 2a and 2b may be of the type employed on ratchet wheels so that a relative movement of the two plate sections 1a and 1b by hand in longitudinal direction of said table structure for purposes of effecting adjustment will not be necessary, inasmuch as the inclined surfaces of said ratchet teeth will, with the corresponding design of the pressure spring, automatically disengage the intermeshing teeth while on the other hand the straight parts of the teeth will assure a proper arresting of the table sections relative to each other.

In order to reduce the weight of the plate sections 1a and 1b to a minimum, the plate sections have a hollow back so that a narrow web will remain on the longitudinal sides and a wide web will remain on the wide sides. The wide webs of the plate sections 1a and 1b are provided with bores 4a and 4b, the axes of which are parallel to the axis of the hinge means 2 and which bores serve for receiving a connecting yoke 5 or connecting hooks.

The embodiment illustrated in the drawing is equipped with a connecting yoke 5 which is bent to a U-shaped profile from round stock material, so that the legs of the U are parallel to the web and have outwardly pointing extensions. By means of these extensions, the yoke 5 is inserted in two oppositely located bores 4a and 4b so that it can be pivoted. Inasmuch the distance of the two legs of the U-profile is less than the diameter of the steering wheel, the connecting yoke 5 will rest on the outer wheel surface of the steering wheel. Inasmuch as the connecting yoke 5 is, by means of the bearing parts in the respective table sections 1a or 1b pulled downwardly due to the weight of the table structure, it will have the tendency to pivot into the hollow portion of the table plate. In this way, the table structure will be firmly pulled against the steering wheel.

When it is desired to move the table structure to a different level, it is merely necessary to move the connecting yoke 5 out of its respective pair of bores and to insert it into another pair of bores. If, in conformity with the place conditions, or with regard to the distance between the steering wheel and the driver, the wider or narrower table sections 1a or 1b is to be used as table, it will suffice to mount the connecting yoke 5 on the back side of the corresponding other table section 1b or 1a.

If desired, also other mountings on the two table sections 1a and 1b may be provided. Furthermore, it is possible to hold in bores 4a and 4b other connecting elements as, for instance, hooks or yokes known in connection with head rests, by means of which the table plate may be connected to side windows, back rests or the like, or even outside the motor vehicle.

It is, of course, to be understood that the present invention is, by no means, limited to the particular construction shown in the drawings, but also comprises any modifications within the scope of the appended claims.

What I claim is:

1. A table structure for use in motor vehicles, which includes in combination: a table having two sections of unequal size, hinge means associated with said sections and hinging the same together along a longitudinal edge of each of said two sections, said two sections being foldable selectively from a position in which both sections are in a common plane to any one of a plurality of positions in which said two sections form with each other an obtuse angle of less than 180°, means for holding said two sections in their respective adjusted relative position, a plurality of bearing means provided on the back side of at least one of said two sections and respectively arranged along two substantially parallel planes extending in the direction substantially at a right angle to said hinged together edges and spaced from each other in the longitudinal direction of said hinged together edges, and suspending means selectively insertable in any of said bearing means for adjusting the level of suspending said table to the convenience of not only size of steering wheel diameter but also size and thickness of the user of said table.

2. A table structure in combination according to claim 1, in which the free longitudinal edges of said two table sections are provided with strips protruding from the front surface of said table sections.

3. A table structure in combination according to claim 1, in which said suspending means has a U-shaped contour with the end portions of the legs thereof detachably insertable in said bearing means, the distance between said legs being less than the maximum diameter of a steering wheel on which said table structure is to be suspended.

4. A table structure in combination according to claim 1, in which said bearing means include pairs of axially aligned bores on opposite sides of at least one table section, and in which said suspending means includes a U-shaped round resilient wire having the end portions of its legs extending outwardly in the longitudinal direction of said suspending means for detachable insertion in any of said pairs of axially aligned bores.

5. A table structure in combination according to claim 1, in which said hinge means include pairs of hinge eyes with the eyes of each pair respectively connected to said table sections and having one end face of one eye facing one end face of the other eye, said two end faces which face each other being provided with intermeshing teeth, and yieldable spring means continuously urging said teeth-equipped end faces against each other.

6. A table structure in combination according to claim 5, in which said teeth are ratchet teeth.

7. A table structure in combination according to claim 5, in which said teeth are selectively disengageable from each other against the thrust of said spring means.

8. A table structure in combination according to claim 1, in which said two table sections have different widths.

* * * * *